Feb. 8, 1955　　　　F. E. SUTTER　　　　2,701,601
RUBBER TIRE AND WHEEL RIM THEREFOR
Filed Nov. 1, 1950　　　　　　　　　　2 Sheets-Sheet 1

INVENTOR
FRANCIS E. SUTTER

BY Willits Hardman & Fehr
HIS ATTORNEYS

INVENTOR
FRANCIS E. SUTTER

United States Patent Office 2,701,601
Patented Feb. 8, 1955

2,701,601

RUBBER TIRE AND WHEEL RIM THEREFOR

Francis E. Sutter, Dayton, Ohio, assignor to General Motors Corporation, Detroit, Mich., a corporation of Delaware Application November 1, 1950, Serial No. 193,357

1 Claim. (Cl. 152—388)

This invention relates to wheel tires of flexible material such as rubber or rubber-like materials and method of making same.

An object of this invention is to provide a simple efficient rubber tire and wheel rim combination wherein the tire can be readily loosely assembled upon the wheel rim and thereafter have a portion thereof distorted by simple effective means to more tightly engage the wheel rim. The tire and rim combinations of this invention are especially suitable for lawn mower wheels, wheel barrow wheels, vacuum sweeper wheels, tricycle wheels, and similar uses.

Another object of this invention is to provide a very simple and economical method of making the rubber tire of this invention.

Further objects and advantages of the present invention will be apparent from the following description, reference being had to the accompanying drawings wherein preferred embodiments of the present invention are clearly shown.

Figure 7:
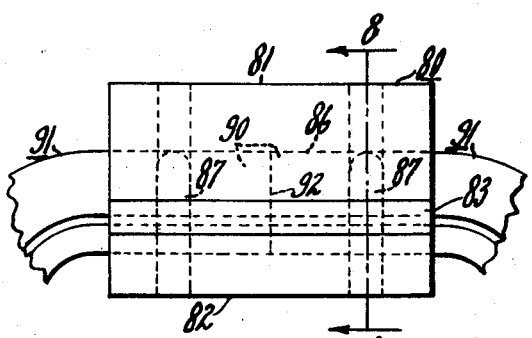
Figure 8:
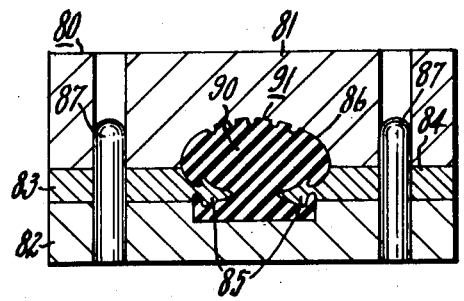

Figs. 7 and 8 show a mold used for vulcanizing together two ends of an extruded length of tire blank to form an endless tire. Fig. 7 is a side elevation of the mold with the two ends of tire in place therein. Fig. 8 is a section taken on line 8—8 of Fig. 7.

Similar reference characters refer to similar parts throughout the several views.

Figure 1:
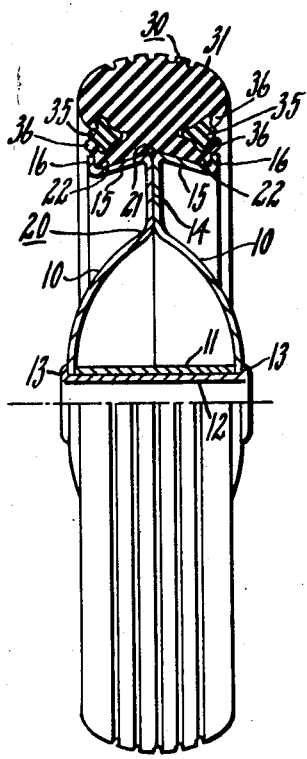
Fig. 1 shows a wheel rim and tire made according to this invention, and is in part a section taken on a radial line thru the wheel and in part an edge elevation thereof.
Figure 2:
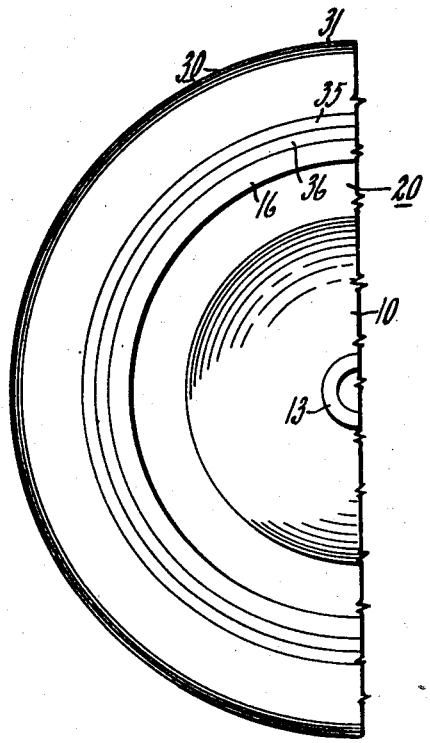
Fig. 2 is a side elevation of the wheel of Fig. 1.
Figure 3:
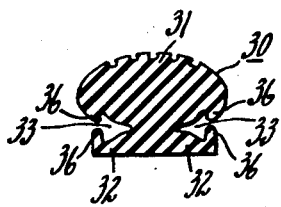
Fig. 3 shows a cross section thru the rubber tire of Fig. 1 at the time it is first assembled upon the wheel rim.

Referring to Figs. 1, 2 and 3, reference numeral 10 designates the two pressed metal disk portions of the wheel, which are rigidly held in spaced relation at their central portions by the metal spacer sleeve 11 and by the axially centered sleeve 12 whose outer ends are riveted over (as shown at 13 in Fig. 1) to securely fix these parts together. The outer contacting portions of the two disks 10 are rigidly fixed together by electric spot welds 14 or by other suitable means. Disks 10 each has an integral main load-carrying flange 15 terminating in a radially projecting peripheral flange 16 extending around the wheel. Thus flanges 15 and 16 together form the tire-supporting wheel rim designated as a whole by 20. Preferably the main flanges 15 of rim 20 extend at an angle to each other to form an annular high portion 21 on rim 20 (as seen in section in Fig. 1) which supports the central portion of the annular rubber tire 30. Thus the diameter of the annular high portion 21 is greater than the diameter of other portions of the two flanges 15, that is, each half of rim 20 is shaped to provide peripherally extending annular depressions or grooves 22 in the tire-supporting surface of rim 20, which depressions 22 lie between the high central portion 21 and the outside edge flanges 16. The advantages and purposes of depressions 22 will appear hereinafter.

The endless flexible rubber tire 30 is made to a section substantially as shown in Fig. 3, having a main body 31 and two integral flexible wing portions 32 extending completely around the inner periphery of tire 30. These wing portions 32 are formed by the two opposed annular voids or grooves 33 extending laterally into the side walls of tire 30 where they are substantially spaced from the tread portion of the tire. Each flexible wing portion 32 can be readily flexed radially outwardly by distorting the rubber thereof, due to the voids or grooves 33 lying adjacent thereto permitting said wing portions to move at least partially within the space of said voids.

Now the inside diameter of tire 30 (when in its normal non-distorted shape) is preferably made equal to or only slightly less than the outside diameter of the tips of the flanges 16 on rim 20, hence the endless tire 30 can very readily be first relatively loosely assembled upon rim 20 simply by passing the tire laterally over one side of rim 20 until the tire is centered on the rim. After such assembling is done tire 30 is tightened upon rim 20 by radially inwardly distorting its two flexible wings 32 into the desired permanent pressure contact with rim 20. This is done by progressively inserting the flexible rubber filler strips 35 into the grooves 33 so as to expand said grooves into larger cross section and thereby force the flexible wings 32 to bend inwardly into tight contact with rim 20. As shown in Fig. 1, these flexible wings 32 will be forced down snugly within the depressions 22 in the outer surface of rim 20. Thereafter the tire 30 will be very securely retained in place upon rim 20 without the necessity of using adhesive cement or the like. As shown in Fig. 3, the outer edges of the lateral grooves 33 have overhanging rounded lips 36 which readily yield to permit the flexible rubber filler strips 35 to be progressively inserted within grooves 33 along the length thereof (preferably by means of a suitable hand tool). After such insertion the overhanging lips 36 will partially overlap said filler strips and securely retain them in locked position within the expanded grooves 33 as illustrated in Fig. 1. Preferably grooves 33 and their filler strips 35 are made roughly wedge-shaped in cross section, however if so desired the flexible rubber filler strips 35 may have a circular or other cross section. In all cases however filler strips 35 should have such a size and cross section as to force the flexible wings 32 radially inward into pressure contact with rim 20 when finally inserted into their grooves 33.

In order to remove tire 30 from its rim 20 for replacement or for any other reason, strips 35 may be first removed from their assembled positions within grooves 33 by means of pliers or other tools, after which the tire 30 will again become relatively loose on its rim and may be passed laterally over one of the flanges 16 to remove the tire from its rim.

Figure 4:
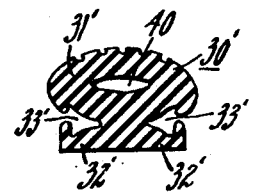
Fig. 4 is a section thru a modified form of rubber tire.

Fig. 4 shows in its normal non-distorted shape a modified tire 30' which is similarly mounted upon its wheel rim in the manner described above. The main body 31' of tire 30' however has an endless annular void 40 within its interior. Void 40 contains air under atmospheric pressure and hence gives a material pneumatic effect to the tire for greater cushioning. The flexible wings 32' are forced into pressure contact with the tire-supporting surface of the rim by inserting suitable filler strips into the annular grooves 33' substantially as described above.

Figure 5:
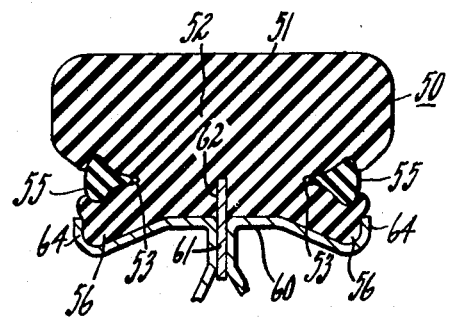
Fig. 5 shows a section thru another modification of wheel rim and tire combination.

In Fig. 5 the flexible rubber tire 50 has a relatively wide flat tread surface 51 designed for carrying heavier loads than the forms of Figs. 3 and 4. In this form the metal rim 60 has a radially projecting circular flange 61 which fits snugly within a corresponding annular groove 62 provided in the relatively wide body 52 of the tire 50 to give greater lateral stability to the assembled tire by preventing relative lateral movement between the tire and rim 60. The two rubber filler strips 55 are inserted into their respective lateral grooves 53 to force the flexible rubber wing portions 56 into tight engagement with the tire-retaining edge flanges 64 on rim 60, all in a manner similar to that described above in connection with Figs. 1 to 3.

Figure 6:
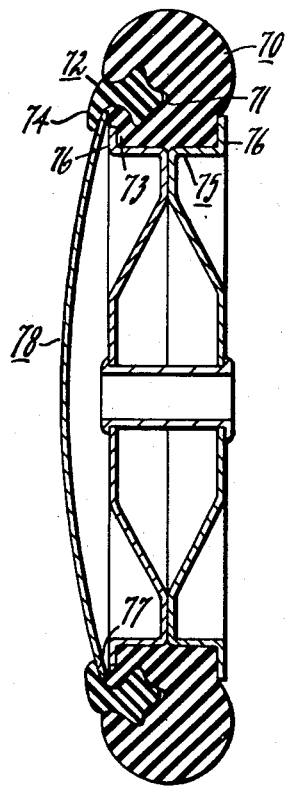
Fig. 6 shows a further modification of wheel, wheel rim and rubber tire combination.

Fig. 6 shows a form of this invention which is more suitable for children's toy wagons and the like, wherein the flexible rubber tire 70 has an annular lateral groove 71 on only one side thereof, and a flexible rubber filler strip 72 for forcing the flexible wing portion 73 inwardly into tight engagement with the tire-contacting surfaces of the metal rim 75. In this form the section of the one filler strip 72 is sufficiently large relative to the section of the entire tire 70 as to substantially compress the inside periphery of tire 70 against both of the small edge flanges 76 and thereby secure tire 70 to rim 75. Also in this form the rubber filler strip 72 has an integral flexible annular lip 74 which extends around tire 70 in close proximity to the outer wall thereof and thereby forms a peripherally extending annular groove 77 between said lip 74 and the adjacent side wall of tire 70. The circular cover plate 78 for the wheel is finally assembled in place by having its outer edge inserted snugly within said groove 77 after filler strip 72 is assembled upon tire 70 as shown in Fig. 6. This cover plate 78 is thus yieldably retained upon the wheel and is removable and replaceable at will by distorting the flexible lip 74 outwardly with a screw-driver or other wedge-shaped hand tool. It will be noted that in this form of the invention the cover plate 78 aids materially in retaining the filler strip 72 in its groove 71 in the tire.

If so desired, all the above described rubber tires may be individually molded in an annular mold to the non-distorted cross sections shown to form an endless annular tire. However great economies can be obtained when making the tires of this invention by first extruding in long continuous lengths vulcanizable tire blanks having the desired non-distorted cross section, for instance such as shown in Figs. 3 or 4. Such long extruded tire blanks may then be cured in strip form in any suitable vulcanizing chamber in a well known manner so as to provide fully cured flexible rubber blanks having the desired non-distorted cross sections described herein. Now according to this invention, a cured relatively long tire blank is cut into shorter lengths to form a plurality of tires of any desired diameter dependent on the length so cut off. The two ends of each short length are brought into accurate butt engagement and integrally bonded together by vulcanization to form an individual endless tire having the above described continuous annular grooves in the side walls thereof. Figs. 7 and 8 illustrate how such accurate bonding together of the abutting ends is done.

The butt vulcanizing fixture 80 is divided into upper and lower portions 81 and 82, and located therebetween are the two plates 83 and 84 having core portions 85 on the ends thereof. These separable fixture parts are accurately located relative to each other by the four guide pins 87 which are fixed to lower portion 82 and have a sliding fit within corresponding holes in parts 81, 83 and 84. The cavity 86 for receiving the two abutting tire ends to be vulcanized together is formed partly in each of said parts 81, 82, 83 and 84, as clearly shown in section in Fig. 8. Cavity 86 has a uniform cross section throughout its length (see Fig. 7) and is made to conform with the cross section of the rubber tire 91 inserted therein. Now in using said fixture 80, parts 81, 83 and 84 are removed from the lower portion 82, and the two plates 83 and 84 have their core portions 85 fitted snugly into the correspondingly shaped lateral grooves in the two end portions 90 of the tire 91. The abutting end surfaces 92 of said end portions 90 are pressed together after first being suitably coated over with a vulcanizable rubber cement coating. Then the thus assembled tire ends 90 and plates 83 and 84 are set down upon the lower fixture portion 82 while being guided by guide pins 87. Finally the upper fixture portion 81 is similarly set in place, whereupon the tire ends 90 and all the fixture parts will be accurately located as shown in Fig. 8. This assembly is then held tightly clamped together and subjected to a vulcanizing temperature, as by steam heated platens, to strongly vulcanize together and integrating the abutting end surfaces of the tire ends 90 along line 92 (see Fig. 7). In so doing, it will be noted that the flexible wing portions of the tire are positively maintained in accurate alignment and that the core portions 85 will positively maintain the lateral grooves in the side walls of the tire in exact alignment. The tire ends 90 may be readily removed from the vulcanizing fixture by disassembling the tire and fixture parts in the reverse order from that used in assembling same. The integrated tire ends 90 are removed as a unit with the two plates 83 and 84, after which said plates 83 and 84 are separated laterally to withdraw their core portions 85 laterally from their grooves in the flexible rubber walls of the tire, the flexibility of the overhanging lips on the tire permitting such withdrawal.

The term "rubber" wherever used in this application is intended to include all compounds of natural or synthetic rubber as well as other flexible rubber-like materials having general properties which render it suitable for making the tires and filler strips described herein.

While the embodiments of the present invention as herein disclosed, constitute a preferred form, it is to be understood that other forms might be adopted.

What is claimed is as follows:

In combination a wheel having a rim, said rim having a base comprising outwardly and downwardly inclined portions terminating at the outer ends in tire-retaining, radially outwardly extending projections, a tire of non-metallic flexible material mounted on said rim, said tire having an endless annular groove extending laterally into each side wall thereof and each forming annular flexible wing portions located at the inner periphery of said tire and forming a part thereof, each groove disposed radially outwardly of said rim projections, said wing portions being capable of being flexed radially outwardly into said groove to facilitate the assembly of said tire on said rim, and a resilient filler strip for each of said grooves inserted laterally thereinto after said tire has been passed into place over said tire retaining projections, the cross sectional area of each groove when said tire is mounted on said rim being smaller than the cross sectional area of the uninserted filler strip, said filler strips operable upon insertion within said grooves to press said flexible wing portions radially inwardly against the downwardly inclined portion of said rim.

References Cited in the file of this patent

UNITED STATES PATENTS

| Number | Name | Date |
|---|---|---|
| 636,930 | Sweet | Nov. 14, 1899 |
| 652,989 | Wheeler | July 3, 1900 |
| 802,159 | Dykes | Oct. 17, 1905 |
| 815,571 | Williams | Mar. 20, 1906 |
| 852,529 | Swinehart | May 7, 1907 |
| 1,526,012 | Rett | Feb. 10, 1925 |
| 1,581,087 | Overman | Apr. 13, 1926 |
| 1,586,737 | Geyer | June 1, 1926 |
| 2,189,137 | Eichner | Feb. 6, 1940 |
| 2,423,147 | Hinman | July 1, 1947 |
| 2,534,252 | Engler | Dec. 19, 1950 |
| 2,559,591 | Burkley | July 10, 1951 |
| 2,591,048 | Bush | Apr. 1, 1952 |